United States Patent [19]
Webb

[11] 3,980,055
[45] Sept. 14, 1976

[54] FUEL SAVER AND POLLUTION CONTROL DEVICE

[76] Inventor: Charles Leonard Webb, 4834 E. Central St., Zachary, La. 70791

[22] Filed: Oct. 4, 1974

[21] Appl. No.: 512,073

Related U.S. Application Data

[63] Continuation-in-part of Ser. No. 464,104, May 29, 1974, abandoned.

[52] U.S. Cl. .............................. 123/25 B; 123/141; 123/25 L
[51] Int. Cl.² ........................................ F02D 19/00
[58] Field of Search ............ 123/25 B, 25 D, 25 R, 123/25 A, 25 L, 141; 48/180 R; 261/78 R

[56] References Cited
UNITED STATES PATENTS

| | | | |
|---|---|---|---|
| 1,205,693 | 11/1916 | Woolf et al. | 123/25 B |
| 1,340,580 | 5/1920 | Trego | 123/25 B |
| 1,512,242 | 10/1924 | Schmitt | 123/25 B |
| 1,519,483 | 12/1924 | Burns | 123/25 B |
| 1,631,362 | 6/1927 | Collrard | 123/25 B |
| 1,680,537 | 8/1928 | Grooms | 123/25 B |
| 1,699,215 | 1/1929 | Wheeler | 123/25 B X |
| 1,749,030 | 3/1930 | Ingelton | 123/25 B |
| 1,952,964 | 3/1934 | Baudains | 123/25 B |
| 2,036,834 | 4/1936 | Schmitt | 123/25 B X |

*Primary Examiner*—Charles J. Myhre
*Assistant Examiner*—Ira S. Lazarus
*Attorney, Agent, or Firm*—Edgar E. Spielman, Jr.; David L. Ray

[57] ABSTRACT

An apparatus for improving fuel economy and abating exhaust gas pollution for four cycle, reciprocating piston, internal combustion engines or rotary engines, including a water reservoir, a heat exchanger for converting water from the water reservoir to steam, a conduit for conveying steam to a water trap in which steam from the heat exchanger is separated from liquids in the steam, a conduit for conveying steam from the water trap to the carburetor, a mixing chamber attached to the carburetor for mixing the steam with fuel, and a heat exchanger for heating fuel prior to the entry of fuel into the mixing chamber.

5 Claims, 2 Drawing Figures

FUEL SAVER AND POLLUTION CONTROL DEVICE

CROSS REFERENCE TO RELATED APPLICATION

This application is a continuation-in-part of application Ser. No. 464,104, filed May 29, 1974, now abandoned.

BACKGROUND OF THE INVENTION

1. Field of the Invention

This invention relates to a method for mixing steam with fuel in a carburetor by utilizing the heat from the exhaust manifold to convert water from a water reservoir to steam.

2. Description of the Prior Art

U.S. Pat. No. 1,897,344 which issued Feb. 14, 1933 to Stimetz discloses a method for mixing steam with gasoline. In addition, the following U.S. Pat. Nos. cover various ways for utilizing the heat from the exhaust manifold to convert water to steam which is in turn fed to the carburetor:

| | | |
|---|---|---|
| 1,409,313 | 1,465,828 | 1,528,305 |
| 1,542,999 | 1,543,732 | 1,783,746 |
| 1,805,644 | 1,848,455 | 1,852,852 |

SUMMARY OF THE INVENTION

In accordance with the present invention there is provided an apparatus for improving gas economy and abating exhaust gas pollution for four cycle, reciprocating piston, internal combustion engines or rotary engines (such as Wankel engines) which includes a water reservoir, a heat exchanger heated by the exhaust gases of the engine which converts water flowing from the water reservoir to steam, a water trap in which water is separated from the steam from the heat exchanger, a conduit attached to the steam trap for conveying steam to the carburetor of the engine, a mixing chamber connected to the carburetor for mixing steam and fuel prior to the entry of the fuel into the combustion of the engine, and a heat exchanger for heating fuel prior to the entry of the fuel into the mixing chamber.

DESCRIPTION OF THE PREFERRED EMBODIMENTS

Figure 1:
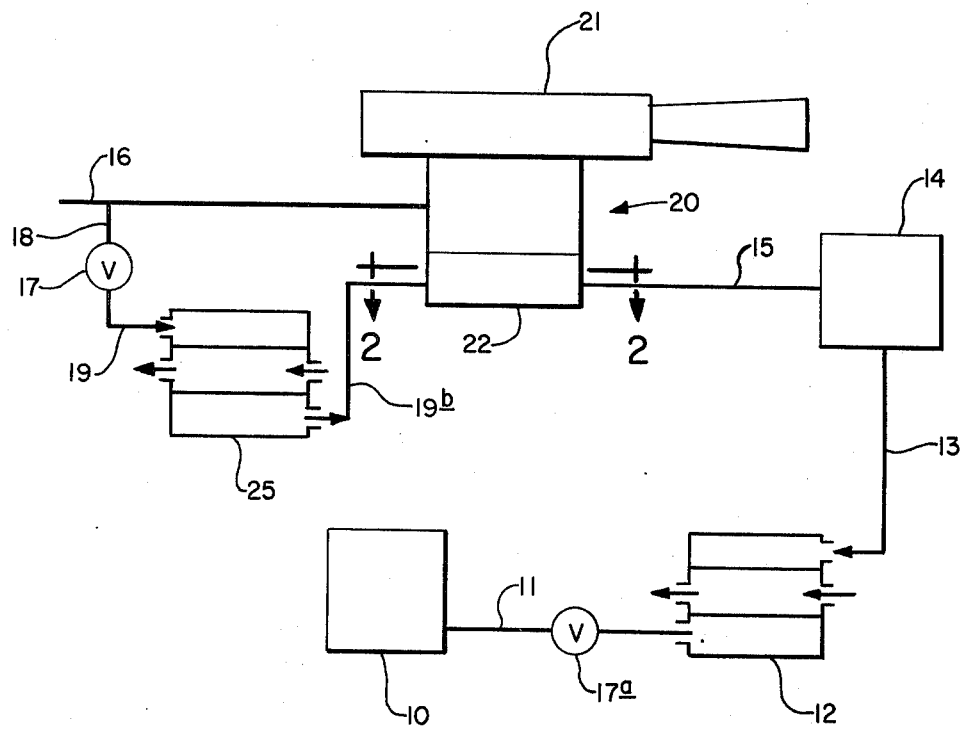
FIG. 1 is a schematic representation of the apparatus of the present invention.

Referring now to FIG. 1, a water reservoir 10 of any desired type, such as a plastic or metal container or jug, is connected by water line or conduit 11 to a heat exchanger 12. The amount of water flow is regulated by valve 17a. Heat is supplied to the heat exchanger 12 from the exhaust gases (not shown) of an engine. The heat from the exhaust gases may be transferred from heat exchanger 12 by any means well known in the art. For example, heat exchanger 12 may be physically connected to the exhaust manifold (not shown) of the engine by metals which will conduct heat from the manifold to heat exchanger 12. Or, the exhaust gases may be directed through the heat exchanger 12 as is well known in the heat exchanger art. The water reservoir 10 is preferably located above the heat exchanger so that the water will flow by gravity into and through the heat exchanger 12. Heat exchanger 12 converts the water into steam which is transferred by conduit 13 to water trap 14. Water trap 14 removes any water from the steam.

Figure 2:
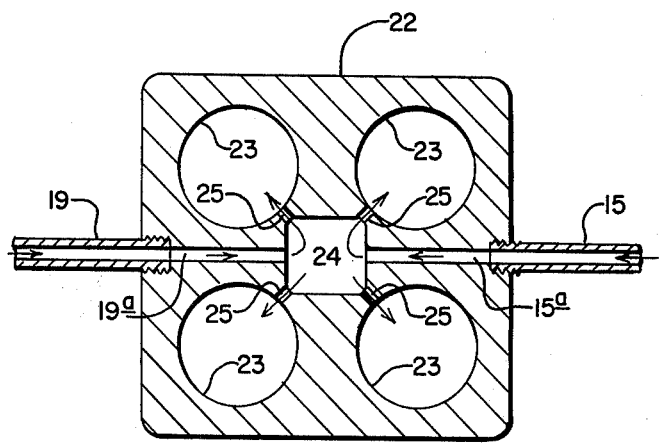
FIG. 2 is a cross-sectional view of the lower portion of a carburetor constructed in accordance with the present invention taken along lines 2—2 of FIG. 1.

The steam continues from water trap 14 through conduit 15 to the carburetor, generally indicated by the numeral 20. As can be seen in FIG. 1, the carburetor has schematically represented on the top thereof an air filter 21. At the bottom of carburetor 20 is bottom plate 22, which can be seen in detail in FIG. 2. Bottom plate 22 contains four holes or ducts 23 therein through which the air-fuel-steam mixture is conveyed downwardly to the combustion chambers. The number of holes 23 may be varied from one to eight or more. Gasoline or other fuel is carried to lower plate 22 and mixing chamber 24 by line 16 connected to line 18 and valve 17 which can be varied to regulate the amount of gasoline continuing onward through line 18 to heat exchanger 25. Heat exchanger 25 can be identical in construction and operation as heat exchanger 12. Also, one heat exchanger could be used to heat both the fuel and the water. Line 16 is connected to a conventional venturi (not shown) in the carburetor, whereas line 19 is connected to the lower plate 22, as can be seen in FIG. 2. Heated fuel from heat exchanger 25 continues on through line 19b to tube or hole 19a in lower plate 22 and on to mixing chamber 24. Steam enters chamber 24 through line 15 and tubular chamber 15a. In chamber 24, steam is mixed with heated fuel and the mixture in turn is forced outwardly through channels 25 into holes 23 and onward into the combustion chamber of the engine for combustion. By introducing the steam and heated fuel at opposite sides of mixing chamber 24, thorough mixing of fuel and steam is achieved.

The fuel entering heat exchanger 25 is preferably heated to a temperature of at least about 250°F, but not more than about 500°F, or more preferably, the fuel is heated to a temperature sufficient to convert at least 50% by volume of the fuel to a gas.

The foregoing is considered as illustrative only of the principles of the invention. Further, since numerous modifications or changes will readily occur to those skilled in the art, it is not desired to limit the invention to the exact construction and operation shown and described, and accordingly all suitable modifications and equivalents may be resorted to, falling within the scope of the invention as claimed.

What is claimed:

1. An apparatus for improving gas economy and abating exhaust gas pollution for four cycle, reciprocating piston, internal combustion engines or rotary engines, consisting essentially of, in combination with a four cycle, reciprocating piston, internal combustion engine, the following elements:
   a. a water reservoir;
   b. a heat exchanger located within the exhaust manifold of said engine and beneath said water reservoir whereby water flowing from said reservoir through a conduit connected to said reservoir and said heat exchanger is turned to steam;
   c. a second conduit connecting said heat exchanger to a water trap in which steam from said heat exchanger is separated from any condensation;

d. a third conduit attached to said steam trap whereby steam is passed therefrom to the gas-air mixture feed of the carburetor of said engine;
e. a fourth conduit attached to said heat exchanger for heating and conveying gasoline to said gas-air mixture feed of the carburetor of said engine;
f. a mixing chamber wherein said heated gasoline and said steam is mixed prior to the entry of said gas and said steam into the gas-air mixture feed of the carburetor of said engine; and
g. plate means containing said mixing chamber, said plate means being located between the downstream end of said carburetor and the intake manifold of said engine, said plate means having a series of holes therein through which the gasoline and air mixture from said carburetor flows, said plate means having channels therein connecting said mixing chamber with said holes.

2. The apparatus of claim 1 wherein said heat exchanger is located outside said exhaust manifold.

3. The apparatus of claim 1 wherein a second heat exchanger is connected to the exhaust manifold of said engine, and fourth conduit are connected to said second heat exchanger for heating gas prior to entry of the gas into the gas-air mixture feed of the carburetor of said engine.

4. The apparatus of claim 3 wherein valve means is connected to said fourth conduit means for regulating the flow of said gasoline through said second heat exchanger.

5. The apparatus of claim 1 wherein valve is connected to said conduit for regulating flow of water from said water reservoir to said heat exchanger.

* * * * *